Sept. 9, 1924. 1,508,061
G. A. PERLEY
PROCESS OF AND APPARATUS FOR THE MANUFACTURE OF NITROGEN OXIDE.
Filed Oct. 23, 1919
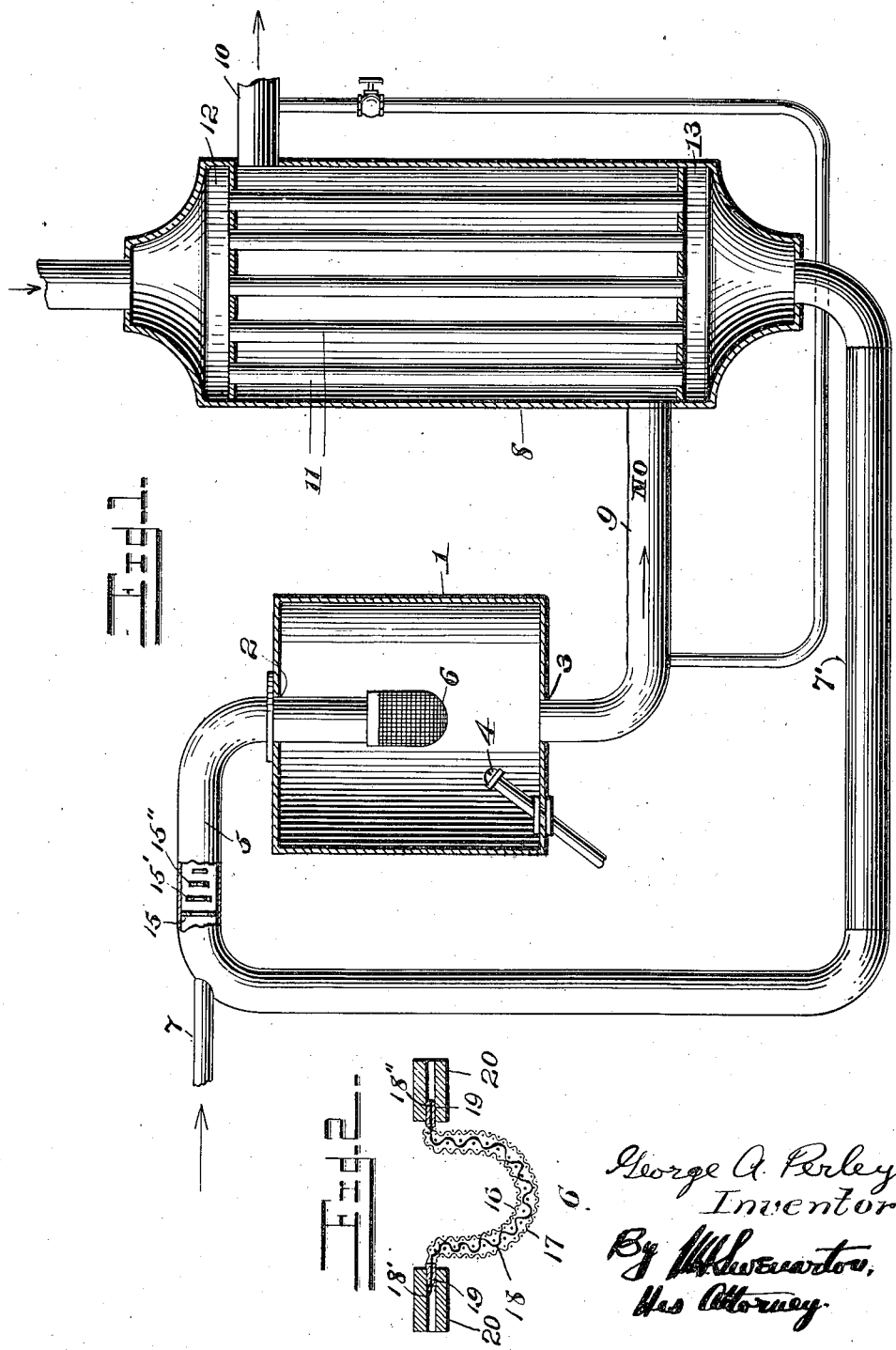

Patented Sept. 9, 1924.

1,508,061

UNITED STATES PATENT OFFICE.

GEORGE A. PERLEY, OF DURHAM, NEW HAMPSHIRE.

PROCESS OF AND APPARATUS FOR THE MANUFACTURE OF NITROGEN OXIDE.

Application filed October 23, 1919. Serial No. 332,792.

*To all whom it may concern:*

Be it known that I, GEORGE A. PERLEY, a citizen of the United States, residing at Durham, county of Strafford, State of New Hampshire, have invented an Improvement in Processes of and Apparatus for the Manufacture of Nitrogen Oxide, of which the following is a specification.

This invention relates to the catalytic production of nitrogen oxides through the oxidation of ammonia in the presence of a catalyst and the reduction to a minimum of the loss of nitrogen in its elementary form.

I am aware that it has been proposed to catalytically oxidize ammonia by rapidly passing the same, together with air or oxygen, over a catalyst, such catalyst being electrically heated or otherwise. It has also been proposed by Kaiser in Patent No. 987,375 to preheat the air employed for the oxidation of ammonia to from about 300° to 400° C., prior to the admixture of ammonia therewith, by passing the same through a chamber the walls of which are of quartz, for example, and are subjected to the direct heat from gas burners. While in this patent yields as high as 99.8% are claimed, my investigations have shown that nowhere near such results can be obtained when employing this process on what could reasonably be deemed a commercial scale. Furthermore as this process required the combustion of additional fuel, there was only slight apparent advantage over a system in which the catalyst was directly heated either electrically or otherwise.

My investigations have led to the discovery that it is possible to obtain yields of nitrogen-oxygen compounds, exceeding even 95% of the theoretical, by increasing the velocity of the reaction to a much higher point than that heretofore employed or proposed, through the employment of preheaters for the oxidizing medium which are stationed well in advance of the point where the ammonia is introduced into such medium in order to obtain an extremely high temperature in the reaction chamber whereby the time of reaction is minimized.

The essential reactions which can occur in the oxidation of ammonia are as follows:

No. 1. $4NH_3 + 8O_2 = 4HNO_3 + 4H_2O$
No. 2. $4NH_3 + 7O_2 = 4NO_2 + 6H_2O$
No. 3. $4NH_3 + 5O_2 = 4NO + 6H_2O$
No. 4. $4NH_3 + 3O_2 = 2N_2 + 6H_2O$
No. 5. $2NO = N_2 + O_2$
No. 6. $4NH_3 + 6NO = 5N_2 + 6H_2O$

The employment of a catalyst results in the acceleration of reaction No. 3 at a much greater rate than reaction No. 4 could be accelerated when employing high temperatures and consequently the raising of the temperature of the mixture can, in the presence of a catalyst, accelerate No. 3 much more than it does reaction No. 4.

As is well known, the speed of the ammonia oxidation reaction will increase with the temperature of the gas. When it is desired to produce nitrogen oxides it is essential, in order to obtain highly efficient yields, to greatly increase the velocity of the flow of the gases so as to prevent the ultimate formation of nitrogen and obtain the products of the intermediate stage of oxidation. This increased velocity can be obtained by increasing the temperature of the gases. As a consequence it is possible to feed the gases through the catalyst at a very much higher velocity than heretofore. For example, by increasing the rate of reaction, about twice as much gas can be passed through the catalyst in a given time. By thus increasing the velocity of the passage of gas through the catalyst and consequently decreasing the time of contact, the formation of nitrogen will be minimized.

Moreover by feeding the gas to the catalyst at nearly the reacting temperature, physical variations such as expansion of the gas molecules are prevented within, and adjacent to the catalyst surface. For example, it may be assumed that miniature reaction explosions occur from the expansion of the relatively cool gases upon contact with the hot catalyst and thus set up vibrations. Consequently if the gas is simultaneously expanding in all directions, the molecules will play back and forth over the catalyst and thus unduly prolong the time of contact therewith, with the result that there occurs a complete oxidation to nitrogen. There is abundant evidence to show that there is serious decomposition of ammonia at the temperature resulting from the oxidation reaction and hence there is no ammonia determinable in the oxidation reaction products where the catalyst chamber is properly insulated.

An apparatus suitable for carrying out my improved process is illustrated in the accompanying drawings, forming a part of this specification, in which, Figure 1 is a vertical section of such an apparatus and Figure 2 is an enlarged detail vertical sectional view designed to show the construction of the catalyst. Referring to the drawings and the construction shown therein, the reference numeral 1 designates a catalyst chamber, of course suitably insulated, having an inlet 2, outlet 3, and pilot burner 4.

A heat-insulated pipe or conduit 5, of suitable material as silica, or silica lined iron for example, which is catalytically inactive in so far as the oxidation of ammonia is concerned, projects into and completely fills the inlet 2 of the catalyst chamber in the manner shown and said pipe carries at its inner end a catalyst 6 that is preferably constructed as hereinafter specified. A supply pipe 7 for ammonia, or a rich ammonia-air mixture, connects with said conduit 5 at a point adjacent the catalyst and an auxiliary pipe 7′, of iron or the like, also heat-insulated, connects with the outer end of said pipe or conduit 5 and serves to admit preheated air or oxygen from a heat interchanger or preheater. The latter as shown comprises a shell or casing 8 having an inlet conduit 9 and outlet conduit 10 and contains a cluster of tubes 11, preferably of steel or cast iron, which afford communication between chambers 12 and 13 at the top and bottom respectively thereof. The inlet conduit 9 receives the gaseous reaction product from the outlet 3 of the catalyst chamber which preferably are about 800° C. or even higher and said reaction products pass around the bare tubes 11 and thence through the conduit 10, from which they are discharged at a temperature of about 200° C. into the water cooler of the absorption system.

An air intake serves to introduce air at a temperature of about 20° C., for example, to the pre-heater wherein it becomes heated by the extremely hot reaction products.

Preferably, a series of spaced rings 15, 15′, and 15″ of successively smaller diameter are arranged within the pipe 5 beyond the place at which the pipe 7 connects therewith in order to effect a more thorough mixture of the ammonia with the heated air or oxygen.

While any suitable catalyst may be employed in the foregoing apparatus, I preferably employ a multi-layer catalyst consisting of 2 or more platinum gauzes, of for example, 120 mesh composed of say .002″ or .0026″ wire and spaced apart by a coarse screen of platinum of about ¼″ mesh, which is of sufficient dimensions so as not to choke the intermediate space and consequently to increase the velocity to the second layer. Preferably, when employing platinum gauze of about .002″ or .0026″ wire as above described, the spacer is made from wire approximating .2″ to .5″ in diameter.

While the layers may if desired be cylindrical and concentrically arranged, the same are preferably made to conform to an approximate cone or bag-shape, simulating the ordinary Welsbach mantle, as for example, as illustrated in Fig. 2 wherein inner and outer blunted cones 16 and 17, formed of 120 mesh gauzes of .002″ platinum wire, are spaced apart by a ¼″ nickel screen 18, also conforming to a blunted cone and formed from .3″ wire. The upper terminals 18′, 18″, of the wires forming said spacing screen are brazed to a heavy rod or wire 19 held in a clamp 20.

By the employment of a multi-layer catalyst such as above described, I accomplish an autogenous cooling of the catalyst by conduction with the consequent approximate equalization of temperature throughout the same. Accordingly, without danger of overheating I am able to expand the heat zone while avoiding irregular heating and thereby the effective contact surface is greatly increased.

The aforesaid spacer 18, while it may be other material than platinum or nickel, should comprise a heat-conducting substance which does not decompose nitric oxide, for example, iron and silica are unsuitable for this purpose. If the spacer is a non-conductor, the heat of reaction will selectively heat up the various layers with the result that reactions 4, 5 and 6 will occur.

Preferably, in carrying out my invention, the air is preheated to about 700° C., and in no event less than 300° C., and when this preheated air and the ammonia mixed therewith react, a temperature of approximately 1000° C. will be developed when oxidizing approximately 85 lbs. to 100 lbs. of ammonia per ounce of platinum catalyst per day. All this will occur substantially independent of the size of the chamber, provided the same is properly insulated.

It is essential that the ammonia be introduced in proximity to the catalyst and yet sufficiently far away therefrom to admit of the efficient mixing of the ammonia with the air or ammonia-air mixture. For example, where the air is passed through a preheater and then into a silica lined pipe, and mixed with a 30% ammonia-air mixture, the resultant gas when passing at the rate of about 300 cu. ft. of mixture per minute through a 6″ pipe, can be conducted, without decomposition from overheating, through pipe lines several feet long.

When using pure ammonia, care must be taken to prevent overheating prior to the contact of the mixture with the gauze, and this is accomplished by introducing the ammonia, in the proportions of about one to ten, to the preheated air at a point closer to the catalyst or else by decreasing the preheating temperature. Moreover, if, as above stated, the walls of the mixing chamber should act catalytically upon the mixture prior to contact with the catalyst proper at the elevated temperature employed, the objectionable fourth reaction above noted will take place.

The increase of velocity or rate of gas flow at low temperature such as about 300° to 400° C. as specified in the patents to Ostwald No. 858,904 and also said patent to Kaiser, will give poor yields due to the failure of reaction No. 3 to occur effectively. On the other hand, the increase of the temperature alone will favor reaction 4, 5 and 6. The increase of the gas reaction velocity, in presence of a suitable catalyst, due principally to the increase of temperature will favor reaction No. 3 and not give time for reaction 4, 5 and 6 to occur.

It is desirable that the temperature within the catalyst proper should be well above 950° and preferably should approximate 1000° C., as impurities, such as soluble tars, phosphines etc., which in themselves are contact poisons, will be substantially decomposed or their action inhibited at such temperatures. For example, it is believed that in the case of phosphine, there is a tendency for the compound platinum phosphide to be formed which has been found to be completely decomposed above 900° C.

As a result of the procedure herein described, whereby the speed, or velocity of the ammonia oxidation reaction is greatly increased and the mixture of ammonia and the oxidizing medium is delivered to the catalyst at approximately the catalyst temperature, whereby undue or excessive expansion changes of the mixture within the catalyst body is prevented, it is possible to secure much greater stability because of the decrease in the multiplicity of expansion changes within the gas, and as a consequence I am able to secure a two- or three-fold capacity as compared with other methods. Moreover, this method gives even a slightly greater efficiency, due to the greater stability produced by decreasing the large heat-expansion changes which result when a cold intake gas mixture is employed, as well as by securing a higher gas reaction velocity with a high gas temperature, as compared with those methods wherein the gauze was electrically heated.

The foregoing procedure is not limited to platinum catalysts, as I have found that other non-platinum catalysts give excellent results when employed in carrying out the foregoing method.

An effective area for the transfer surface in the heat interchanger tubes, approximates 200 sq. ft. per 2000 lbs. of ammonia per diem.

Obviously, the catalyst body, which preferably protrudes well within the catalyst chamber, must be confined by a body which will not melt at 1000° C., the temperature of the reaction zone in my preferred procedure. For this purpose I prefer either nickel or aluminum and preferably silica lined, as it is important that such material should not be a catalyst itself for the intake gas mixture. The projection of the catalyst into the catalyst chamber, permits of the heat of reaction surrounding the metal tube carrying said catalyst and thus gradually preheating the entering gas mixture by stages through conduction. Coarse meshed silica mats within this tube may assist this heating.

While I preferably employ the heat interchange to preheat the air when using the improved catalyst herein described, said catalyst is very effective, far more so than many prior catalysts, when the same is directly heated, and far more effective results can be obtained than when using a simple gauze or a multi-layer gauze wherein a nonconducting medium such as air, for example, is interposed between such gauzes.

Having thus described my invention, what I claim and desire to secure by Letters Patent of the United States is:

1. The process of making nitrogen oxide, which consists in preheating an oxidizing medium, including oxygen and substantially free from ammonia, to a temperature in excess of 400° C., through heat interchange relations with the exit gases of a previous oxidation reaction, then admixing a fluid medium including ammonia with said oxidizing medium and passing the gases through a structure composed of a material which is not an energetic oxidizing catalyst of the mixture, then passing the mixture over an energetic catalytic agent at a sufficient speed to substantially prevent the oxidation of ammonia to elemental nitrogen.

2. The process of making nitrogen oxide, which consists in preheating an oxidizing medium, including oxygen and substantially free from ammonia, to a temperature in excess of 500° C., through heat interchange relations with the exit gases of a previous oxidation reaction, then admixing a fluid medium including ammonia with said oxidizing medium and passing the gases through a structure composed of a material which is not an energetic oxidizing catalyst of the mixture, then passing the mixture over an energetic catalytic agent at a sufficient speed to substantially prevent the oxidation of ammonia to elemental nitrogen.

3. The process of making nitrogen oxide, which consists in preheating an oxidizing medium, including oxygen and substantially free from ammonia, to a temperature in excess of 600° C., through heat interchange relations with the exit gases of a previous oxidation reaction, then admixing a fluid medium including ammonia with said oxidizing medium and passing the gases through a structure composed of a material which is not an energetic oxidizing catalyst of the mixture, then passing the mixture over an energetic catalytic agent at a sufficient speed to substantially prevent the oxidation of ammonia to elemental nitrogen.

4. A catalytic apparatus suitable for the oxidation of ammonia, comprising a plurality of layers of material capable of promoting the oxidation of ammonia to nitrogen oxide, which material is provided with numerous relatively fine openings therethru, and an intermediate layer of material of good conductivity and considerably thicker than either of the layers, said intermediate layer having numerous coarser openings extending therethru.

5. A catalytic apparatus suitable for the oxidation of ammonia, comprising a plurality of layers of material capable of promoting the oxidation of ammonia to nitrogen oxide and means considerably thicker than any of said layers for preventing direct contact between such layers and thereby forming a plurality of separated catalyst layers.

6. An active catalyst suitable for the oxidation of ammonia, comprising a substantially bag shaped envelope, approximately closed at one end, said envelope consisting of a plurality of layers of platinum gauze, adjacent layers being separated by a relatively coarse layer of heat conducting material, which is in contact with each of said adjacent layers.

7. An active catalyst suitable for the oxidation of ammonia, comprising a plurality of layers of platinum gauze of relatively fine mesh, separated by and each in contact with, an intermediate gauze of heat conducting material of relatively coarse mesh.

8. An active catalyst suitable for the oxidation of ammonia, comprising a plurality of layers of platinum gauze of relatively fine mesh and formed of fine gauged wire, a separator medium interposed therebetween and contacting with each of said layers, which is composed of relatively coarse mesh wire that is a heat conductor but a relatively poor promoter of the ammonia oxidation reaction, said layers of gauze being shaped to form an envelope having integral sides and an end, the other end being open.

GEORGE A. PERLEY.